C. E. Warner.
Horse Hay Fork.

Nº 87807. Patented Mar. 16, 1869.

Witnesses
Selden Rice
Beverly Chase
T Herbert Hall

Inventor.
C. E. Warner

CHAUNCEY E. WARNER, OF SYRACUSE, NEW YORK.

*Letters Patent No. 87,807, dated March 16, 1869; antedated March 12, 1869.*

IMPROVEMENT IN HORSE HAY-FORKS.

The Schedule referred to in these Letters Patent and making part of the same.

*To all whom it may concern:*

Be it known that I, CHAUNCEY E. WARNER, of Syracuse, in the county of Onondaga, and State of New York, have invented a new and improved Horse Hay-Fork; and I do hereby declare that the following is a full, clear, and exact description thereof, which will enable those skilled in the art to make and use the same, reference being had to the accompanying drawings, forming part of this specification, in which—

Similar letters of reference indicate like parts in all the figures.

In the accompanying drawings—

Figure 1:
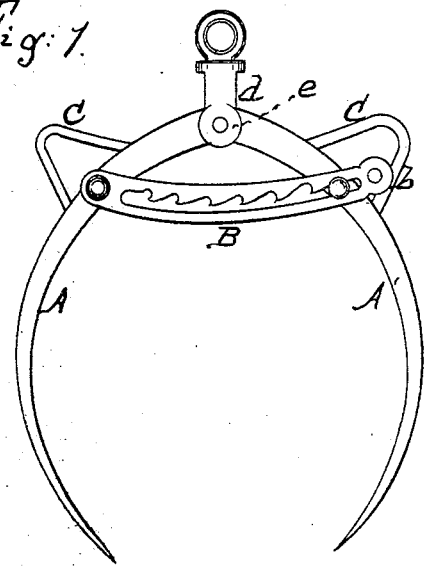
Figure 1 shows the fork opened and in position for inserting in the hay to a considerable depth.
Figure 2:
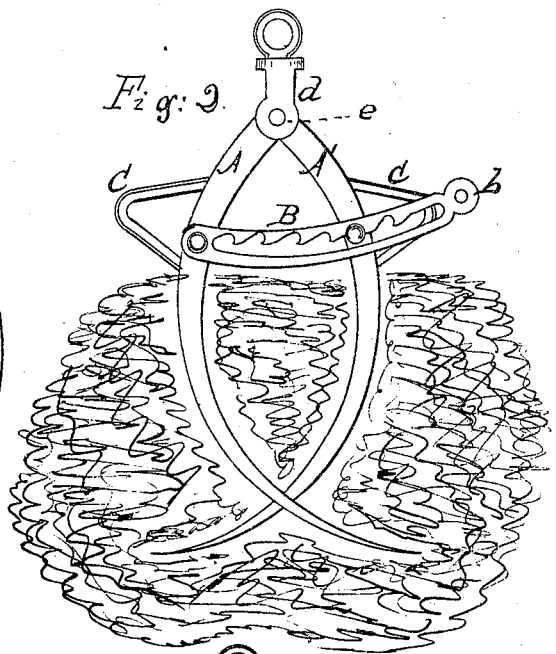
Figure 2 shows the disposition of the load when the fork is so inserted.
Figure 3:
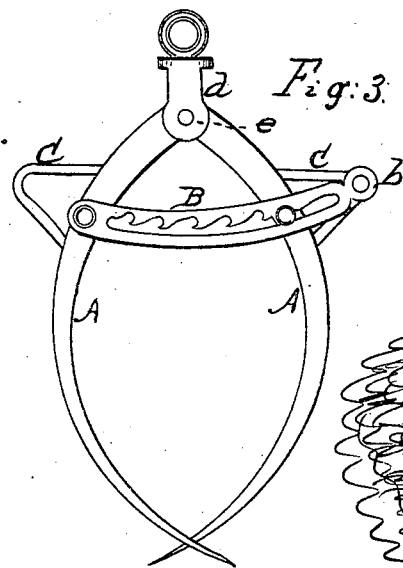
Figure 3 shows the position of the tines of the fork when it is to be inserted in the hay to a moderate depth.
Figure 4:
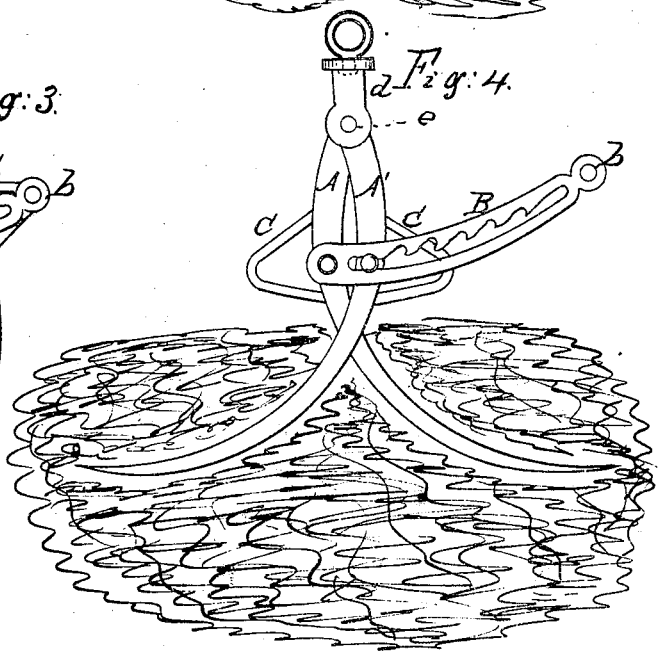
Figure 4 shows the disposition of its load when so inserted.

A A' are the tines,

B is the locking-rack, and

C C are handles.

The tines of the fork are, in general form, made to represent segments of a circle, so that as the fork is pressed into the hay, each tine moves through the hay in a circular direction, until the fork is fully engaged therewith, the tines passing each other, so that their points are thrown outward horizontally as supports for the load.

The tines are then secured in their relative positions by the rack B, one end of which is pivoted to the tine A, while the other end of the rack has sufficient vertical play to allow the rack-teeth to engage or disengage with the neck of a bolt in the tine A'.

The rack B is lifted, for discharging the fork, by a tripping-line, which runs from its eye, $b$, through the shackle $d$, and thence downward to the ground.

In inserting the fork into the hay, the operator takes hold of the handles C C.

For handling manure, or other material which is finer than hay, each side of the fork can be made with two or more tines, instead of a single tine.

By these means I obtain a fork which is simple and efficient in its action.

Having thus described my invention,

What I claim as new, and desire to secure by Letters Patent, is—

The circular tines A A', handles C C, and rack B, all constructed and operating as herein shown, and for the purpose set forth.

The above specification of my invention signed by me, this 25th day of July, 1868.

C. E. WARNER.

Witnesses:
SELDEN RICE,
F. A. MORLEY.